US005804302A

United States Patent [19]

Tamura et al.

[11] Patent Number: 5,804,302

[45] Date of Patent: Sep. 8, 1998

[54] WEB TAKE-UP ROLL

[75] Inventors: Yoshihiko Tamura; Hitoshi Saito; Minoru Furuse; Mineo Yamauchi; Takumi Horii, all of Tokyo-To, Japan

[73] Assignee: DAI Nippon Printing Co., Ltd., Japan

[21] Appl. No.: 798,158

[22] Filed: Feb. 10, 1997

Related U.S. Application Data

[63] Continuation of Ser. No. 625,147, Apr. 1, 1996, Pat. No. 5,646,090.

[30] Foreign Application Priority Data

Apr. 6, 1995 [JP] Japan .................................... 7-106925
Apr. 21, 1995 [JP] Japan ...................................... 7-96335

[51] Int. Cl.$^6$ ........................................................ C09J 7/02

[52] U.S. Cl. ............................................. 428/354; 428/906

[58] Field of Search ..................................... 428/354, 906

[56] References Cited

U.S. PATENT DOCUMENTS 4,721,638 1/1988 Matsuguchi ............................. 428/354

FOREIGN PATENT DOCUMENTS 62-32085 2/1987 Japan .

*Primary Examiner*—Jenna Davis
*Attorney, Agent, or Firm*—Parkhurst & Wendel, L.L.P

[57] ABSTRACT

A web take-up roll including a cylindrical body and a web taken up around the cylindrical body. A terminal portion of the web is joined to the cylindrical body through a double-coated tacky tape including a paper substrate and adhesive layers formed on both sides of the substrate. The substrate is capable of ply separation by a force smaller than a force required to separate adhesive faces of the adhesive layers from either the terminal portion of the web or the cylindrical body.

3 Claims, 3 Drawing Sheets

WEB TAKE-UP ROLL

This is a continuation of application Ser. No. 08/625,147 filed Apr. 1, 1996, now U.S. Pat. No. 5,646,090.

TECHNICAL FIELD

The present invention relates to a thermal transfer image-receiving sheet which, in use, is superimposed on a thermal transfer sheet. More particularly, the present invention relates to a thermal transfer image-receiving sheet which can form a printed, recorded image, having excellent storage stability, with a high density and a high resolution.

BACKGROUND OF THE INVENTION

Various thermal transfer recording systems are known in the art, and one of them is a thermal dye transfer system in which sublimable dyes as a colorant are thermally transferred from a thermal transfer sheet comprising a substrate sheet, such as a polyester film, bearing the colorants, onto a thermal transfer image-receiving sheet comprising a substrate sheet, such as paper or a plastic film, bearing a dye-receptive layer, thereby forming various full-color images on the thermal transfer image-receiving sheet.

In this case, a thermal head mounted on a printer is used as heating means, and dots of three or four colors are transferred onto the receptive layer of a thermal transfer image-receiving sheet by controlled heating for a very short period of time, thereby reproducing a full-color image of an original utilizing the dots of a plurality of colors.

The image thus formed, since dyes are used as the colorant, has excellent sharpness, transparency, halftone reproduction, and gradation, and the quality thereof is comparable to that of images formed by the conventional offset printing or gravure printing and that of full-color photographic images.

The image-receiving sheet for sublimation transfer has a receptive layer, for receiving a dye, on a substrate. In addition, an intermediate layer formed of a resin having a relatively low glass transition point is formed between the substrate and the receptive layer from the viewpoint of imparting cushioning properties and flexibility to the image-receiving sheet.

However, the formation of an image on an image-receiving sheet having an intermediate layer formed of a resin having a low glass transition point poses a problem that, when the sheet with an image transferred thereon is stored at a high temperature for a long period of time, the dye image is diffused into an intermediate layer to cause a sharp image to bleed or blur.

Further, the intermediate layer should serve to adhere the substrate to the receptive layer. When it is formed of a resin having low adhesion, separation occurs between the substrate and the intermediate layer or between the intermediate layer and the receptive layer in the formation of an image in a printer or during use of a print.

DISCLOSURE OF INVENTION

Accordingly, an object of the present invention is to solve the above problems of the prior art and to provide a thermal transfer image-receiving sheet which can form a recorded image, having excellent storage stability, with a high density and a high resolution.

The above object can be attained by the thermal transfer image-receiving sheet of the present invention, comprising: a substrate; and an intermediate layer and a receptive layer formed in that order on at least one surface of the substrate, the intermediate layer containing a polyurethane resin having a glass transition temperature of 40° C. or above, the polyurethane resin being a reaction product of a polycarbonate diol with an isocyanate compound, the polycarbonate diol having a structure represented by the following chemical formula (I):

$$H\left[O\!\left(CH_2\right)_m\!O-\overset{O}{\overset{\|}{C}}\right]_n O\!\left(CH_2\right)_m\!OH \qquad (I)$$

wherein m is 2 to 10 and n is 1 to 10.

According to one embodiment of the present invention, the isocyanate compound is composed mainly of an aliphatic diisocyanate.

According to another embodiment of the present invention, the isocyanate compound is IPDI or HMDI.

According to a further embodiment of the present invention, the polyurethane resin is a reaction product prepared by using a chain extender.

According to yet a further embodiment of the present invention, the chain extender is neopentyl glycol or isophoronediamine.

According to yet a further embodiment of the present invention, the intermediate layer has been further cured with an isocyanate compound.

According to yet a further embodiment of the present invention, the intermediate layer further comprises a white pigment or a fluorescent brightening agent.

Since the intermediate layer contains a polyurethane resin having the above structure, with a glass transition point of 40° C. or above, there is no fear of a dye image, formed on the receptive layer, being diffused into the intermediate layer. Further, the intermediate layer formed of the above resin has a high capability of adhering the substrate to the receptive layer.

Figure 1:
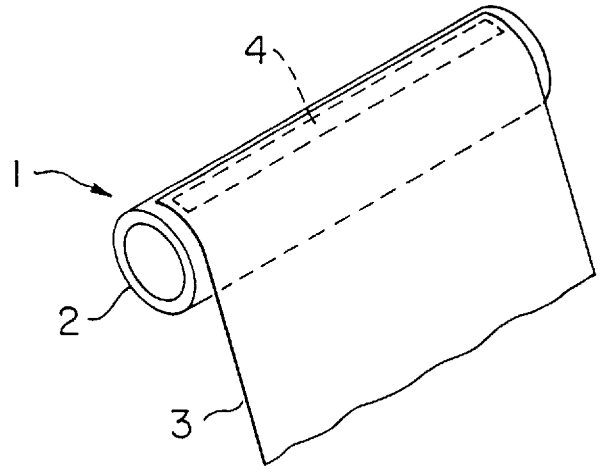
FIGS. 1, 3, 4, 5, and 7 are perspective views of web take-up rolls.

The thermal transfer image-receiving sheet according to the present invention will be described in detail.

Substrate

The substrate functions to support a receptive layer and, preferably, is not deformed by heat applied at the time of thermal transfer and has mechanical strength high enough to cause no trouble when handled in a printer or the like.

Materials for constituting the substrate are not particularly limited, and examples thereof include various types of papers, such as capacitor paper, glassine paper, parchment paper, papers having high size fastness, synthetic papers (polyolefin and polystyrene papers), wood free paper, art paper, coat paper, cast coated paper, wall paper, backing paper, paper impregnated with a synthetic resin or an emulsion, paper impregnated with a synthetic rubber latex, paper with a synthetic resin internally added thereto, cellulose fiber paper, such as paperboard, and films of polyesters, polyacrylates, polycarbonates, polyurethane, polyimides, polyetherimides, cellulose derivatives, polyethylene, ethylene/vinyl acetate copolymer, polypropylene, polystyrene, acrylic resin, polyvinyl chloride, polyvinylidene chloride, polyvinyl alcohol, polyvinyl butyral, nylon, polyetheretherketone, polysulfone, polyethersulfone, tetrafluoroethylene/perfluoroalkyl vinyl ether, polyvinyl fluoride, tetrafluoroethylene/ethylene, tetrafluoroethylene/hexafluoropropylene, polychlorotrifluoroethylene, polyvinylidene fluoride and the like. It is also possible to use a white opaque film, prepared by adding a white pigment or a filler to the above synthetic resin and forming the mixture into a sheet, and a foamed film prepared by foaming the above film. The materials for the substrate, however, are not limited to the above materials.

Furthermore, laminates of any combination of the above substrates may also be used. Representative examples of the laminate include a two-layer laminate of cellulose fiber paper and synthetic paper, a laminate comprising a synthetic paper laminated to both sides of a cellulose fiber paper as a core material, and laminates having the same layer construction as those described above, except that a plastic film is used instead of the cellulose fiber paper. Laminates using a foamed polypropylene film or a foamed polyester film are particularly preferred.

The thickness of the substrate may be any suitable one and usually in the range of from about 10 to 300 μm. If the substrate sheet has poor adhesion to a layer provided thereon, the surface of the substrate sheet is preferably subjected to various types of primer treatment or corona discharge treatment.

Intermediate Layer

The intermediate layer, according to the present invention, formed on the substrate is characterized by containing a polyurethane resin having the following structure, with a glass transition point of 40° C. or above. Since a dye image does not diffuse into the intermediate layer using such a resin, the dye image neither bleeds nor blurs during storage. Further, the intermediate layer has a high capability of adhering the substrate to the receptive layer.

The polyurethane resin having a glass transition point of 40° C. or above may be a reaction product of a polycarbonatediol with an isocyanate compound.

The polycarbonatediol is particularly preferably one having a structure represented by the general formula (I):

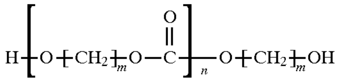
(I)

wherein m is 2 to 10 and n is 1 to 10.

The glass transition point of the resultant polyurethane is influenced greatly by the length of an alkylene chain contained in the polycarbonatediol. Specifically, the glass transition point decreases with increasing the length of the alkylene chain, that is, the glass transition point increases with decreasing the length of the alkylene chain. The use of a polycarbonatediol having a short alkylene chain is necessary in order to prepare the polyurethane usable in the present invention, and the polycarbonate represented by the chemical formula I wherein m is 2 to 8 and n is 2 to 6 is suitable for this purpose.

Specific examples of compounds represented by the chemical formula (I) include 1,6-hexanecarbonatediols represented by the following chemical formula (II):

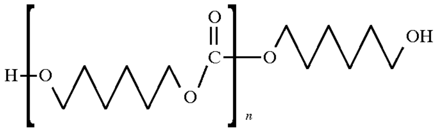
(II)

On the other hand, the isocyanate compound is preferably one having a plurality of isocyanate groups in one molecule and reacted with the above polycarbonatediol to give the polyurethane usable in the present invention.

Preferably, it is composed mainly of an aliphatic diisocyanate. An aromatic diisocyanate is yellowed and causes a change in hue of the surface of the receptive layer in the thermal transfer image-receiving sheet. By contrast, the aliphatic diisocyanate is less likely to be yellowed and, hence, preferred. Among others, IPDI (isophorone diisocyanate) and HMDI (hexamethylene diisocyanate) are preferred. In this connection, the use of an isocyanate having a lower degree of freedom in a larger amount results in the formation of a polyurethane having a higher glass transition point. Therefore, in the above two isocyanates, the use of IPDI in a larger amount than HMDI is preferred.

In the formation of the polyurethane usable in the present invention, the amounts of the polycarbonatediol and the isocyanate compound used are preferably such that the molar ratio of the isocyanate group in the isocyanate compound to the reactive group, reactive with the isocyanate, contained in the polycarbonatediol is 1.0:1.0 to 4.0.

A single kind of the polycarbonatediol may be used in combination with a single kind of the isocyanate compound. Alternatively, for one of or both the polycarbonatediol and the isocyanate compound, a plurality of kinds of the material may be used.

The polyurethane as the reaction product usable in the present invention may be prepared by reacting the above diol component with the above isocyanate compound. In this case, the use of a chain extender in the reaction is preferred because a polyurethane having an increased molecular weight is produced. An intermediate layer formed using a polyurethane having a high molecular weight has high coating strength and, hence, is neither broken nor produces dust at the time of cutting of the image-receiving sheet or during use of the image-receiving sheet. The molecular weight of the polyurethane is preferably in the range of from 3,000 to 50,000.

The amount of the chain extender used may be in the range of from 2 to 80 mol based on 100 mol of the diisocyanate.

Among the above chain extenders, neopentyl glycol and isophoronediamine (IPDA) are preferred because they have a small degree of freedom in the chemical structure and, hence, are highly effective in increasing the glass transition point. Further, combined use of neopentyl glycol and isophoronediamine (IPDA) has a high effect.

In the formation of the intermediate layer, the addition of an isocyanate compound to a coating liquid is preferred from the viewpoint of improving the adhesion of the intermediate layer to the substrate or to the receptive layer. The isocyanate is reacted with a reactive group present on the surf ace of the substrate or in the receptive layer at the time of coating of the intermediate layer or during drying to improve the adhesion.

The isocyanate is usable in an amount in the range of from 2 to 100 mol based on 100 mol of the polyurethane used in the present invention.

Further, the use of a white pigment, such as titanium oxide, calcium carbonate, magnesium carbonate, or zinc oxide, is also preferred because the white pigment can mask glare or lack of uniformity of the substrate sheet, enabling the degree of freedom in the selection of the substrate to be favorably increased. The titanium oxide can be classified into two types, rutile type titanium oxide and anatase type titanium oxide. When the whiteness and the effect of the fluorescent brightening agent are taken into consideration, the use of anatase type titanium oxide wherein the absorption in the ultraviolet portion is on a shorter wavelength side than the rutile type titanium oxide is preferred.

Regarding the mixing ratio of the white pigment, the weight ratio of polyurethane to white pigment may be in the range of from 0.1 to 5.0, preferably in the range of from 0.5 to 3.0.

Further, the fluorescent brightening agent may be added. In this case, it may be added in a weight ratio of polyurethane to fluorescent brightening agent of from 0.001 to 0.050, preferably in the range of from 0.005 to 0.030.

In the present invention, the sole use of polyurethane as the resin for forming the intermediate layer is preferred. Alternatively, the polyurethane may be used in combination with resins other than the polyurethane in order to impart other functions. The resin which may be used in combination with the polyurethane is preferably a resin having high compatibility with the polyurethane used in the present invention. The additional resin may be used in such an amount as will not be detrimental to the effect of the polyurethane resin.

In addition, it is also possible to use two or more types of the polyurethane according to the present invention.

The intermediate layer according to the present invention may be formed by coating a coating liquid containing the above components by coating means, for example, gravure printing, screen printing, or reverse roll coating using a gravure plate, and drying the coating. The coverage of the intermediate layer may be 0.2 to 10.0 $g/m^2$, preferably 0.5 to 4.0 $g/m^2$.

Receptive Layer

The receptive layer provided on the above intermediate layer functions to receive a dye being transferred from a thermal transfer sheet upon heating and to hold the resultant image thereon.

Resins usable for constituting the receptive layer according to the present invention include, for example, polyolefin resins, such as polypropylene, halogenated polymers, such as polyvinyl chloride and polyvinylidene chloride; vinyl resins such as polyvinyl acetate, ethylene/vinyl acetate copolymer, vinyl chloride/vinyl acetate copolymer, and polyacrylic esters; acetal resins, such as polyvinyl formal, polyvinyl butyral, and polyvinyl acetal; various saturated and unsaturated polyester resins; polycarbonate resins; cellulosic resins such as cellulose acetate; polystyrene resin; urea resin; melamine resin; and polyamide resins such as benzoguanamine resin. Among them, polyester resins are preferably used.

Further, it is also possible to use a product prepared by curing the above resin with a curing agent, such as an isocyanate compound, an amino compound, or an organometallic compound. In this case, a catalyst suitable for enhancing the curing reaction rate may be used.

Furthermore, the above resins may also be used as a blend of two or more in any blending ratio such that they are compatible with each other.

The above resin constituting a receptive layer, when heat is applied upon thermal transfer of a dye to form an image, often fuses to a binder resin used for holding dyes. In order to prevent this and provide better releasability, it is preferred to incorporate in the receptive layer various release agents, such as phosphoric esters, surfactants, fluorine compounds, fluororesins, silicone compounds, silicone oil, or silicone resin. In this case, the use of at least one silicone oil is particularly preferred. If necessary, a curing agent, such as a chelating agent or an isocyanate, may be added to cure the silicone oil. Silicone oils usable in a cured state include various modified silicone oils, such as alcohol-modified, carboxy-modified, vinyl-modified, hydrogen-modified, epoxy-modified, amino-modified, and alkyl-modified silicone oils. Further, silicone oils of such a type that a catalyst is used to accelerate the curing reaction may also be used.

The amount of the release agent added varies depending upon the type of the release agent. In general, however, the amount of the release agent is about 1 to 20 parts by weight based on 100 parts by weight of the resin on a solid basis and is preferably such that satisfactory releasability is provided.

When a modified silicone oil having a group reactive with the above curing agent among modified silicone oils is added, the equivalent ratio of the modified silicone oil to the reactive group of the curing agent is preferably in the range of from 1:1 to 1:10.

Alternatively, it is also possible to laminate, as a release layer, a layer of the release agent alone or a layer of a mixture of a binder resin with the release agent on the receptive layer.

A pigment or a filler, such as titanium oxide, zinc oxide, or finely divided silica, may be added to the receptive layer for the purpose of improving the whiteness to further enhance the sharpness of the transferred image or providing matte appearance. Further, an antioxidant, an ultraviolet absorber or the like may also be added.

The receptive layer may be formed by dissolving or dispersing a mixture of the resin with the optional additive (s) in a suitable organic solvent, coating the coating solution (dispersion) by, for example, gravure printing, screen printing, or reverse roll coating using a gravure plate, and drying the resultant coating.

Although the coverage of the receptive layer thus formed may be any desired value, it is generally in the range of from 1.0 to 20.0 $g/m^2$, preferably 1.5 to 6.0 $g/m^2$.

Back Surface Layer

A back surface layer may be provided on the back surface of the thermal transfer image-receiving sheet for purposes of improvement in mechanical carriability of the sheet, prevention of curling of the sheet, or attainment of antistatic effect or for other purposes.

When improved carriability of the sheet is desired, it is preferred to add a suitable amount of an organic or inorganic filler to a binder resin or alternatively to use a highly slippery resin such as a polyolefin resin or a cellulose resin.

On the other hand, when it is desired to impart an antistatic property to the sheet, a layer formed of a conductive resin, such as an acrylic resin, or a conductive filler and a layer containing various antistatic agents, such as a fatty acid ester, a sulfuric ester, a phosphoric ester, an amide, a quaternary ammonium salt, a betaine, an amino acid, or an ethylene oxide adduct, may be provided as an antistatic layer on the substrate or between the back surface layer and the substrate.

The amount of the antistatic agent used may vary depending upon the layer, to which the antistatic agent is added, and the type of the antistatic agent. In all cases, however, the surface resistivity of the thermal transfer image-receiving sheet should preferably be not more than $10^{13}$ Ω/cm$^2$. When the surface resistivity exceeds $10^{13}$ Ω/cm$^2$, thermal transfer image-receiving sheets are likely to adhere to each other due to static electricity, causing sheet-feed troubles in a printer.

The amount of the antistatic agent used is preferably in the range of from 0.01 to 3.0 g/m$^2$. When the amount of the antistatic agent used is less than 0.01 g/m$^2$, the antistatic effect is unsatisfactory. On the other hand, the use of the antistatic agent in an amount of more than 3.0 g/m$^2$ is less cost-effective and, at the same time, unfavorably poses problems of tackiness and the like.

Thermal transfer sheets used, for thermal transfer, in combination with the above thermal transfer image-receiving sheet include a dye sublimation thermal transfer sheet and a hot-melt thermal transfer sheet, comprising a substrate and, coated thereon, a hot-melt ink layer of a pigment or the like, held by a hot-melt binder, which upon heating the ink layer, in its entirety, is transferred to an object.

In the thermal transfer, thermal energy may be applied by any conventional means. For example, a contemplated purpose can be sufficiently attained by applying a thermal energy of about 5 to 100 mJ/mm$^2$ through the control of a recording time by means of a recording device, such as a thermal printer (for example, a video printer VY-100 manufactured by Hitachi, Limited).

Web Take-up Roll

The web take-up roll which is used in installing the image-receiving sheet or transfer film in a thermal transfer printer will now be described.

In general, a transfer film used in the thermal transfer printer (a dye sublimation thermal transfer film comprising a dye layer, formed of a sublimable dye contained in a binder, provided on a plastic film as a substrate or a hot-melt thermal transfer film comprising a pigment, contained in a hot-melt wax, provided on a substrate) is supplied in the form of a take-up roll wherein a transfer film has been taken up around a cylindrical bobbin. Further, the transfer film is supplied also in such a form that a bobbin, around which a transfer film has been taken up, is provided as a feed side bobbin and is set in combination with a take-up side bobbin for taking up the transfer film. A further form of the transfer film supplied is such that a feed side bobbin and a take-up side bobbin are installed in a cassette so that when the transfer film has been used up, the bobbin is replaced together with the cassette in a printer.

One example of the above web take-up rolls is such that the terminal portion of the transfer film has been firmly adhered to a bobbin through an adhesive or a pressure sensitive adhesive double coated tape. In this type of take-up roll, when the transfer film is unrolled to the end, the transfer film is not separated from the bobbin, so that the travelling of the transfer film is stopped resulting in enhanced tension. Due to the tension, a load is applied to a driving motor to increase a current. Therefore, means for detecting the increase in current is provided to detect the complete consumption of the transfer film and to stop the motor. Further, a web take-up roll is also known wherein, in order to avoid the application of a load to the motor, an end mark is provided in the vicinity of the end of the transfer film and detected with detection means on the printer side to stop recording operation.

A further type of the web take-up roll is such that the terminal portion of the transfer film is weakly bonded to the bobbin. This type of the web take-up roll is designed so that, when the transfer film has been completely consumed in a printer, the transfer film is removed from the bobbin by taking advantage of a take-up torque and the termination of the transfer film is detected by taking advantage of a change in the take-up torque or the like.

For the former web take-up roll in the above web take-up rolls, since the transfer film remains connected to the bobbin after use, the transfer film remains unremoved within a printer, making it difficult to remove the bobbin from the printer or cassette after completely unrolling the transfer film. In the latter web take-up roll, the terminal portion of the transfer film can be simply separated from the bobbin. In this case, however, the pressure sensitive adhesive remains applied to the terminal portion of the transfer film, posing a problem of contamination of internal mechanisms, such as a recording head or a platen roller of a printer, with the adhesive.

This is found, besides the above take-up roll of the transfer film, in such a take-up roll that an image-receiving sheet (an image-receiving sheet comprising a substrate of a plastic sheet, paper, synthetic paper, or a laminate thereof and a receptive layer, provided on the substrate, formed of a synthetic resin to be dyed with a dye transferred from a thermal transfer film to form an image) has been taken up around a cylindrical body such as a paper tube.

Therefore, it is preferred to use a web take-up roll wherein the terminal portion of the web can be simply separated from the cylindrical body and, at the same time, can be passed through within the printer without causing any trouble such as contamination of the internal mechanisms.

In order to attain the above object, the present embodiment relates to a web take-up roll comprising a cylindrical body and a web take-up roll, of which the terminal portion is joined to the cylindrical body, and wound around the cylindrical body, characterized in that the terminal portion of the web is joined to the cylindrical body through a pressure sensitive adhesive double coated tape having high adhesive strength and paper, which causes ply separation by a smaller force than the adhesive strength of the adhesive face in the pressure sensitive adhesive double coated tape, is used as a substrate sheet for the pressure sensitive adhesive double coated tape.

In the web take-up roll having the above construction, when the web is used up in a printer, the substrate sheet for the pressure sensitive adhesive double coated tape causes ply separation through the action of the torque on the take-up side. As a result, the terminal portion of the web is separated from the cylindrical body and, in this state, taken up around the take-up side roll. In this case, the complete consumption of the web is detected on the printer side by a reduction in load of the take-up torque. Alternatively, the complete consumption of the web may be detected on the printer side by such a phenomenon that the web is not set in place after the elapse of a given period of time. In this case, although the terminal portion of the web is passed through within the printer, no pressure-sensitive adhesive is exposed after separation of the terminal portion of the web. Therefore, there is no fear of the internal mechanisms being contaminated with the pressure-sensitive adhesive.

Embodiments of the above web take-up roll will be described with reference to the accompanying drawings.

Figure 2:
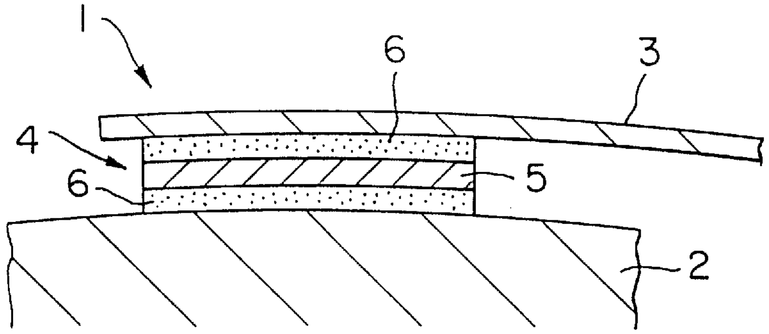
FIG. 2 is an enlarged cross-sectional view of a principal part of the web take-up roll shown in FIG. 1.

FIG. 1 is a perspective view of a web take-up roll according to one embodiment of the present invention, and FIG. 2 an enlarged cross-sectional view of the principal part of the web take-up roll shown in FIG. 1. Regarding the present embodiment, a description will be given on a transfer film which has been taken up around a bobbin.

As shown in FIGS. 1 and 2, a web take-up roll 1 comprises a bobbin 2 and a transfer film 3 taken up around the bobbin 2. The terminal portion of the transfer film 3 is joined onto the bobbin 2 through a pressure sensitive adhesive double coated tape 4. As shown in FIG. 2, the pressure sensitive adhesive double coated tape 4 comprises a substrate sheet 5 as a core material and a pressure-sensitive adhesive 6 coated on both sides of the substrate sheet 5. The pressure-sensitive adhesive 6 has high adhesive strength, and the substrate sheet 5 is paper which causes ply separation through the action of a smaller force than the adhesive strength of the adhesive face in the pressure sensitive adhesive double coated tape 4. More specifically, kraft paper, newsprint and the like may be used as the substrate sheet 5, while pressure-sensitive adhesives having high adhesive strength, such as natural rubber and acrylic pressure-sensitive adhesives, may be used as the pressure-sensitive adhesive 6. Commercially available pressure sensitive adhesive double coated tapes of this type include "FREE TAPE P2" marketed by NIHON RIKA SEISHI CO., LTD.

Figure 3:
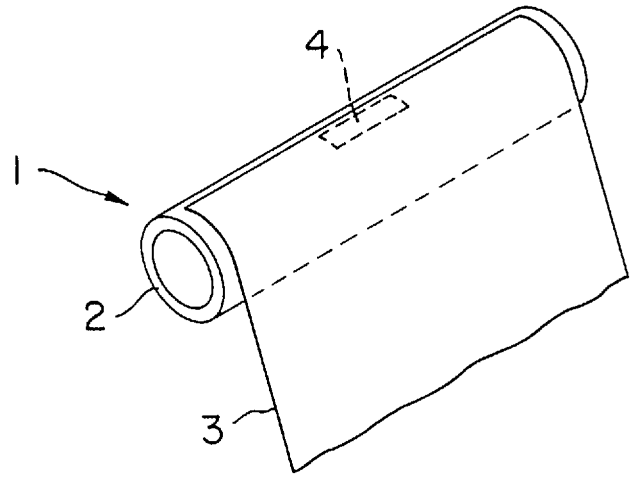
Figure 4:
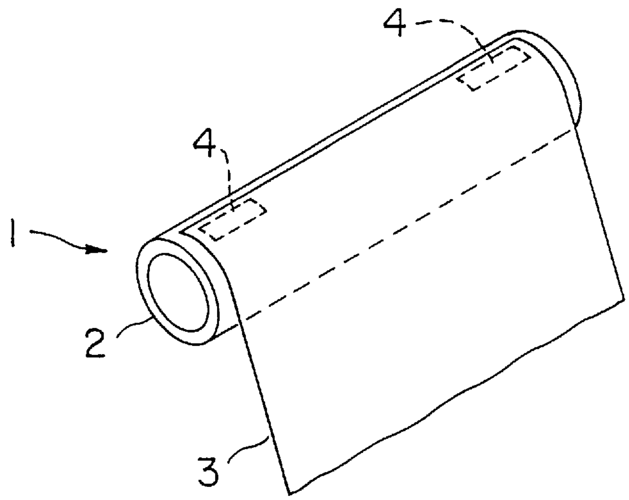
Figure 5:
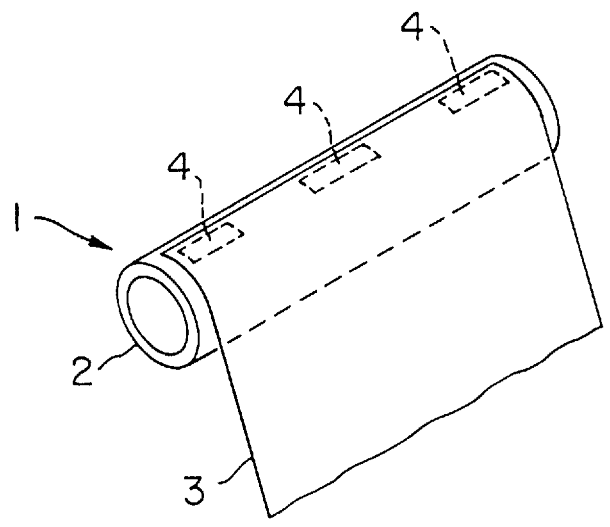

In FIG. 1, the pressure sensitive adhesive double coated tape 4 used for joining the bobbin 2 to the transfer film 3 is provided over substantially the whole width of the transfer film 3. However, various modifications are possible such as the provision of the tape 4 only on the center of the transfer film 3 as shown in FIG. 3, the provision of the tape 4 only on both ends of the transfer film 3 as shown in FIG. 4, and the provision of the tape 4 on three places as shown in FIG. 5.

Figure 7:
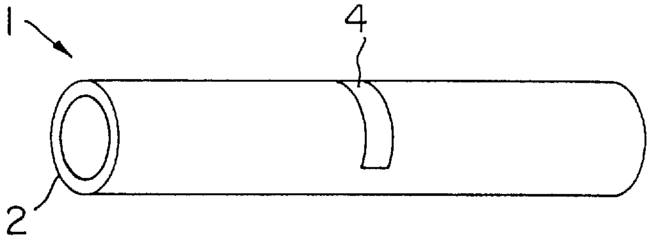

As shown in FIG. 7, preferably, the pressure sensitive adhesive double coated tape is used in the longitudinal direction of the bobbin. When it is used in the longitudinal direction of the bobbin, the adhesive strength at the time of take-up of the web is the same as that when the tape is used in the lateral direction of the bobbin. However, the peel adhesion in the case of complete consumption of the web may be smaller than that when the tape is used in the lateral direction of the bobbin.

For the pressure sensitive adhesive double coated tape, the position of the application and the size may be properly varied according to the web pulling force in a printer, the size and quantity of the web to be taken up and the like. The pressure sensitive adhesive tape double coated tape may be applied only to one place, i.e., to the center of the bobbin, as shown in the drawing. Alternatively, it may be applied to two or more places.

For example, when the tensile force of the image-receiving sheet carrying mechanism within the printer is 200 gf, the peel adhesion between the image-receiving sheet and the bobbin is regulated to about 100 gf. More specifically, when an image-receiving sheet having a width of 130 mm is taken up, a pressure sensitive adhesive double coated tape having a width of 10 mm and a length of 50 mm is preferably used in the longitudinal direction of the bobbin on its center. Further, when the image-receiving sheet is taken up, a force is applied to the lateral direction of the bobbin, so that there is no possibility that the bobbin and the image-receiving sheet are separated from each other at the time of take-up of the image-receiving sheet.

Either of the receptive layer and the substrate of the image-receiving sheet may be joined to the bobbin through the pressure sensitive adhesive double coated tape. In the case of the thermal transfer film as well, either of the substrate and the dye layer may be joined to the bobbin.

An attempt to separate the transfer film 3 from the bobbin 2 results in ply separation of the substrate sheet 5 before the separation of the adhesive face in the pressure sensitive adhesive double coated tape 4. In this case, the total force necessary for separating the transfer film 3 from the bobbin 2 is preferably determined by taking the torque of the driving motor on the take-up side of the printer into consideration. In the case of a conventional thermal transfer printer (record width 10 to 30 cm), setting is preferably conducted such that ply separation occurs under a take-up tension of not more than 200 g. Such setting enables the transfer film 3 to be satisfactorily separated from the bobbin 2 and taken up without applying an excessive load to a driving motor on the take-up side. The peel adhesion of the transfer film 3 to the bobbin 2 can be easily regulated by varying the width or length of the pressure sensitive adhesive double coated tape 4 used.

Figure 6:
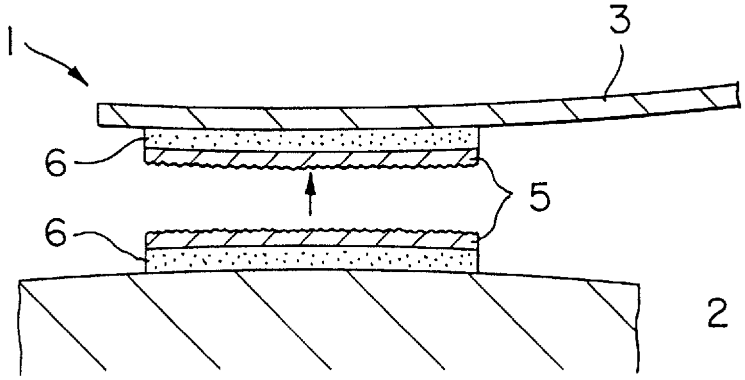
FIG. 6 is a cross-sectional view showing such a state that a web has been separated from a cylindrical body.

In the use of the above web take-up roll 1 in a thermal transfer printer, when the transfer film 3 is completely consumed, as shown in FIG. 6, the torque created by the driving motor on the take-up side causes ply separation of the substrate sheet 5 and the transfer film 3 is easily separated from the bobbin 2 and taken up round the bobbin on the take-up side. Thus, the separation of the transfer film 3 gives rise to a change in take-up torque on the take-up side. This phenomenon can be utilized to detect the complete consumption of the transfer film 3 by means of detection means on the printer side. Alternatively, the complete consumption of the transfer film 3 can be detected by providing, on the printer side, means for detecting such a phenomenon that the transfer film 3 is not set in place after the elapse of a given period of time. In this case, although the terminal portion of the transfer film 3 is passed through within the printer, no pressure-sensitive adhesive 6 is exposed on the transfer film 3 after separation of the terminal portion of the transfer film. Therefore, there is no fear of the internal mechanisms of the printer being contaminated with a pressure-sensitive adhesive. Further, in the replacement of the bobbin 2 on the feed side, what is required is only to remove the empty bobbin, simplifying the replacement work.

In the above embodiment, the web take-up roll 1 is installed alone in and removed from the thermal transfer printer. Alternatively, the web take-up roll of the present invention may be of such a type that it is set in combination with the bobbin on the take-up side. Further, the web take-up roll may be such a type that the bobbin on the feed side and the bobbin on the take-up side are installed in a cassette. Further, in the above embodiment, a transfer film is taken up around the bobbin. The same is applicable to an image-receiving sheet which has been taken up around the paper tube or the like.

The above web take-up roll can be applied widely to image-receiving sheets other than the image-receiving sheet of the present invention as well as to transfer films.

The web take-up roll of the present invention is usable in an automatic printing system, for example, in a photo-booth. In the automatic printing system, the starving of the thermal transfer sheet or the image-receiving sheet as consumable materials poses a serious problem associated with stable operation of the system. In the web take-up roll of the present invention, the system can be designed so that complete consumption of the thermal transfer sheet or image-receiving sheet during operation of the system is detected and the replacement of the thermal transfer sheet or image-receiving sheet is automatically performed.

For example, in the case of an image-receiving sheet, when the image-receiving sheet is used up, the tensile force applied by the image-receiving sheet carrying mechanism in the printer creates ply separation of the substrate sheet in the pressure sensitive adhesive double coated tape, causing the terminal portion of the image-receiving sheet to be separated from the bobbin. The separated image-receiving sheet is discharged by means of a carrying mechanism within the printer to the outside of the printer.

In the discharge of the image-receiving sheet, the terminal portion of the image-receiving sheet is detected, and the front portion of a reserve image-receiving sheet provided within the printer is taken out and automatically carried by means of a carrying mechanism of the printer to a position where printing is to be initiated. The termination of the image-receiving sheet may be detected by providing a sensor, in a carrier path of the image-receiving sheet, between the image-receiving sheet roll and the printing position to determine the presence or absence of the image-receiving sheet. Alternatively, it may be detected by taking advantage of a reduction in load of the image-receiving sheet carrying mechanism.

In this way, the stoppage of printing attributable to starving of the image-receiving sheet can be avoided. In particular, in an automatic printing system, maintenance requirement is reduced, contributing to a reduction in operation cost of the system.

As described above, the web take-up roll is constructed so that the terminal portion of the web is joined to a cylindrical body through a pressure sensitive adhesive double coated tape having high adhesive strength and paper, which causes ply separation through the action of smaller force than the adhesive strength of the adhesive face in the pressure sensitive adhesive double coated tape. In such a construction, when the web is unrolled and used up in a printer, the take-up torque on the take-up side causes ply separation of the substrate sheet of the pressure sensitive adhesive double coated tape, enabling the terminal portion of the web to be easily separated from the cylindrical body. In this case, although the terminal portion of the web is passed through within the printer, no pressure-sensitive adhesive is exposed on the web after separation of the terminal portion of the transfer film. Therefore, there is no fear of any trouble occurring attributable to contamination of the internal mechanisms of the printer with the pressure-sensitive adhesive.

The present invention will be described in more detail with reference to the following examples and comparative examples. In the following examples and comparative examples, all "parts" or "%" are by weight unless otherwise specified.

Example A1

A 150 $\mu$m-thick synthetic paper (FPU 150, manufactured by Oji-Yuka Synthetic Paper Co., Ltd.) was provided as a substrate, and the following coating liquids respectively for an intermediate layer and a receptive layer were gravure-coated in that order on one surface of the substrate at respective coverages on a dry basis of 2.5 g/$m^2$ and 3.0 g/$m^2$, and, for each coating, drying was carried out at 130° C. for 3 min, thereby forming an intermediate layer and a receptive layer.

| | |
|---|---|
| Intermediate layer | |
| Polyurethane resin<br>Glass transition point: 70° C.<br>Molecular weight: about 20,000<br>A reaction product of IPDI/<br>1,6-hexanecarbonatediol/IPDA/<br>neopentyl glycol in a composition<br>ratio of 3/1/1/1 | 10 parts |
| Titanium oxide<br>(TCA-888, manufactured by Tohchem Products Corporation) | 30 parts |
| Toluene/methyl ethyl ketone/isopropanol = 3/3/4 | 160 parts |
| Receptive layer | |
| Vinyl chloride/vinyl acetate copolymer<br>(#1000A, manufactured by Denki Kagaku Kogyo K.K.) | 75 parts |
| Polyester resin<br>(Vylon 600, manufactured by Toyobo Co., Ltd.) | 25 parts |
| Catalyst-curable silicone oil<br>(X-62-1212, manufactured by The Shin-Etsu Chemical Co., Ltd.) | 6 parts |
| Platinum catalyst<br>(PL 50T, manufactured by The Shin-Etsu Chemical Co., Ltd.) | 3 parts |
| Methyl ethyl ketone/toluene = 1/1 | 400 parts |

Example A2

A thermal transfer image-receiving sheet was prepared in the same manner as in Example A1, except that the following coating liquid for an intermediate layer was used instead of the coating liquid, for an intermediate layer, used in Example A1.

| Intermediate layer | |
|---|---|
| Polyurethane resin<br>Glass transition point: 70° C.<br>Molecular weight: about 20,000<br>A reaction product of IPDI/<br>1,6-hexanecarbonatediol/IPDA/<br>neopentyl glycol in a composition<br>ratio of 3/1/1/1 | 20 parts |
| Titanium oxide<br>(TCA-888, manufactured by Tohchem Products Corporation) | 20 parts |
| Fluorescent brightening agent<br>(UVITEX OB, manufactured by Chiba Geigy) | 0.4 part |
| Toluene/methyl ethyl ketone/isopropanol = 3/3/4 | 160 parts |

Example A3

A thermal transfer image-receiving sheet was prepared in the same manner as in Example A1, except that the following coating liquid for an intermediate layer was used instead of the coating liquid, for an intermediate layer, used in Example A1.

| Intermediate layer | |
|---|---|
| Polyurethane resin<br>Glass transition point: 75° C.<br>Molecular weight: about 20,000<br>A reaction product of IPDI/<br>1,6-hexanecarbonatediol/IPDA/<br>neopentyl glycol in a composition<br>ratio of 4/1.5/1/1.5 | 10 parts |
| Titanium oxide<br>(TCA-888, manufactured by Tohchem Products Corporation) | 30 parts |

-continued

| Intermediate layer | |
|---|---|
| Fluorescent brightening agent (UVITEX OB, manufactured by Chiba Geigy) | 0.2 part |
| Toluene/methyl ethyl ketone/isopropanol = 4/2/4 | 160 parts |

Example A4

A thermal transfer image-receiving sheet was prepared in the same manner as in Example A1, except that the following coating liquid for an intermediate layer was used instead of the coating liquid, for an intermediate layer, used in Example A1.

| Intermediate layer | |
|---|---|
| Polyurethane resin<br>Glass transition point: 75° C.<br>Molecular weight: about 20,000<br>A reaction product of IPDI/1,6-hexanecarbonatediol/IPDA/neopentyl glycol in a composition ratio of 4/1.5/1/1.5 | 20 parts |
| Titanium oxide (TCA-888, manufactured by Tohchem Products Corporation) | 20 parts |
| Fluorescent brightening agent (UVITEX OB, manufactured by Chiba Geigy) | 0.4 part |
| Toluene/methyl ethyl ketone/isopropanol = 3/3/4 | 160 parts |

Comparative Example A1

A thermal transfer image-receiving sheet was prepared in the same manner as in Example A1, except that the following coating liquid for an intermediate layer was used instead of the coating liquid, for an intermediate layer, used in Example A1.

| Intermediate layer | |
|---|---|
| Acrylic polyol (U-230, manufactured by Soken Chemical Engineering Co., Ltd.)<br>Glass transition point: 30° C. | 30 parts |
| Titanium oxide (TCA-888, manufactured by Tohchem Products Corporation) | 10 parts |
| Fluorescent brightening agent (UVITEX OB, manufactured by Chiba Geigy) | 0.2 part |
| Toluene/methyl ethyl ketone = 1/1 | 160 parts |

Comparative Example A2

A thermal transfer image-receiving sheet was prepared in the same manner as in Comparative Example A1, except that cellulose acetate (L-20 (glass transition point: not less than 100° C.), manufactured by Daicel Chemical Industries, Ltd.) was used instead of acrylic polyol in the intermediate layer of Comparative Example A1.

Comparative Example A3

A thermal transfer image-receiving sheet was prepared in the same manner as in Comparative Example A1, except that polyurethane (glass transition point: 30° C.) was used instead of acrylic polyol in the intermediate layer of Comparative Example A1.

Preparation of Thermal Transfer Sheet

A coating liquid, for a dye layer, having the following composition was prepared and coated by means of a wire bar to a coverage on a dry basis of 1.0 g/$m^2$ on a 6 $\mu$m-thick polyethylene terephthalate film, which had been treated for rendering the back surface heat-resistant, and the resultant coating was dried to prepare a thermal transfer sheet.

| Coating liquid for dye layer | |
|---|---|
| Cyan dye (Kayaset Blue 714, manufactured by Nippon Kayaku Co., Ltd.) | 4 parts |
| Polyvinyl butyral resin (S-lec BX-1, manufactured by Sekisui Chemical Co., Ltd.) | 4.3 parts |
| Methyl ethyl ketone/toluene = 1/1 | 8 parts |

Each of the thermal transfer image-receiving sheets prepared in the above examples and comparative examples and the thermal transfer sheet were put on top of the other so as for the dye image-receiving surface to face the dye surface, and heating was performed through the back surface of the thermal transfer sheet by means of a thermal head.

More specifically, recording using a thermal head was carried out under heating conditions of an applied voltage of 14.5 V, a step pattern with the applied pulse width being successively reduced from 6.4 msec/line for each 0.4 msec, and 6 lines/mm (10 msec/line) in the subscanning direction, thereby forming cyan images. Thereafter, bleeding of each image and the adhesion between layers of the sheet were examined. The results were tabulated in Table 1.

Bleeding was evaluated by allowing the print under an environment of 60° C. for 200 hr, and the prints were observed for bleeding of each dot by means of a loupe (magnification: 25 times).

The adhesion was evaluated by a peeling test wherein a conventional pressure sensitive adhesive tape was applied onto the image-receiving surface of the thermal transfer image-receiving sheet and then peeled off from the image-receiving surface.

Evaluation Criteria

○: Separation occurred between the receptive layer and the intermediate layer, causing the receptive layer to be transferred on the side of the pressure sensitive adhesive tape, or separation occurred between the intermediate layer and the substrate, causing the receptive layer and the intermediate layer to be transferred on the side of the pressure-sensitive adhesive tape.

X: Neither separation between layers nor transfer of the receptive layer and the like occurred.

TABLE 1

| | Bleeding | Adhesion |
|---|---|---|
| Ex. | | |
| A1 | None | ○ |
| A2 | None | ○ |
| A3 | None | ○ |
| A4 | None | ○ |
| Comp. Ex. | | |
| A1 | Occurred | ○ |
| A2 | None | x |
| A3 | Occurred | ○ |

According to the present invention, the dye image formed in the receptive layer is not diffused within the intermediate layer enabling a record image having excellent image sharpness and durability to be formed.

Further, since the intermediate layer according to the present invention serves greatly to adhere the substrate to the receptive layer, separation does not occur between the substrate and the intermediate layer or between the intermediate layer and the receptive layer.

Example B

Image-receiving sheets A and B were prepared and slit into a width of 130 mm. The end of the slit image-receiving sheet was fixed to a paper bobbin having a length of 130 mm and an outer diameter of 90 mm with the aid of a pressure sensitive adhesive double coated tape (FREE TAPE, width 10 mm, length 50 mm; manufactured by NIHON RIKA SEISHI CO., LTD.). The pressure sensitive adhesive double coated tape was applied as shown in FIG. 7. After the fixation, the image-receiving sheet was taken up by 50 m.

When the image-receiving sheet was used up in a printer, an image-receiving sheet driving mechanism created ply separation of the substrate sheet of the pressure sensitive adhesive double coated tape, causing the image-receiving sheet to be separated from the bobbin. The separated image-receiving sheet was carried out by means of a carrying mechanism provided within a printer.

Peel force of pressure sensitive adhesive double coated tape: 150 gf

Web take-up tension of printer: 900 gf

Image-receiving Sheet A

| | |
|---|---|
| Layer construction | |
| Antistatic treatment/receptive layer/primer layer/foamed film A1/adhesive layer/core material/adhesive layer/foamed film A2/back surface layer | |
| Antistatic treatment | |
| Quaternary ammonium salt compound (TB-34, Matsumoto Yushi Seiyaku Co., Ltd.) | 1 part |
| Isopropanol | 1000 parts |
| Receptive layer (dry weight 3 $g/m^2$) | |
| Vinyl chloride/vinyl acetate copolymer (Denka Vinyl #1000A, manufactured by Denki Kagaku Kogyo K.K.) | 40 parts |
| Vinyl chloride/styrene/acrylic copolymer resin (Denkalac #1000A, manufactured by Denki Kagaku Kogyo K.K.) | 20 parts |
| Polyester resin (Vylon 600, manufactured by Toyobo Co., Ltd.) | 40 parts |
| Modified silicone oil (x62-1212, manufactured by The Shin-Etsu Chemical Co., Ltd.) | 10 parts |
| Silicone-curable catalyst (CAT PL-50T, manufactured by The Shin-Etsu Chemical Co., Ltd.) | 1 part |
| Toluene | 200 parts |
| Methyl ethyl ketone | 200 parts |
| Primer layer (dry weight 1 $g/m^2$) | |
| Aqueous polyester rein (Polyester WR-905, manufactured by Nippon Synthetic Chemical Industry Co., Ltd.) | 100 parts |
| Anatase type titanium oxide (TCA 888, manufactured by Tohchem Products Corporation) | 25 parts |
| Fluorescent brightening agent (Uvitex BAC, manufactured by CIBA-GEIGY CO.) | 1 part |

-continued

| | |
|---|---|
| Foamed films A1 and A2 | |
| Polypropylene synthetic paper (HDU 60, thickness 60 $\mu$m; manufactured by Oji-Yuka Synthetic Paper Co., Ltd.) | |
| Adhesive layer (dry weight 3 $g/m^2$) | |
| Polyether polyurethane resin (Takelac A969V, manufactured by Takeda Chemical Industries, Ltd.) | 30 parts |
| Isocyanate compound (Takenate A-5, manufactured by Takeda Chemical Industries, Ltd.) | 10 parts |
| Ethyl acetate | 200 parts |
| Core material | |
| Coated paper (Pearl Kote A, 127.9 $g/m^2$; manufactured by Mitsubishi Paper Mills, Ltd.) | |
| Back surface layer (dry weight 1 $g/m^2$) | |
| Polyvinyl butyral (Denka Butyral 3000-1, manufactured by Denki Kagaku Kogyo K.K.) | 10 parts |
| Chelating agent (TP 110, manufactured by Denka Polymer Co., Ltd.) | 4.3 parts |
| Nylon filler (MW 330, manufactured by Shinto Paint Co., Ltd.) | 2 parts |
| Toluene | 40 parts |
| Methyl ethyl ketone | 40 parts |
| Isopropyl alcohol | 10 parts |
| Image-receiving sheet B: | |
| The image-receiving sheet B was prepared in the same manner as described above in connection with the image-receiving sheet A, except that the following receptive layer was used instead of that used in the image-receiving sheet B and the following foamed film B was used instead of the foamed film A. | |
| Receptive layer (dry weight 3 $g/m^2$) | |
| Vinyl chloride/vinyl acetate copolymer (Denka Vinyl #1000A, manufactured by Denki Kagaku Kogyo K.K.) | 100 parts |
| Amino-modified silicone oil (x-22-3050c, manufactured by The Shin-Etsu Chemical Co., Ltd.) | 5 parts |
| Epoxy-modified silicone oil (x-22-3000E, manufactured by The Shin-Etsu Chemical Co., Ltd.) | 5 parts |
| Toluene | 200 parts |
| Methyl ethyl ketone | 200 parts |
| Foamed film B | |
| (Toyopearl SS P4255, 35 $\mu$m; manufactured by Toyobo Co., Ltd.) | |

What is claimed is:

1. A web take-up roll comprising:

a cylindrical body;

a web taken up around the cylindrical body, a terminal portion of said web being joined to said cylindrical body through a double-coated tacky tape comprising a paper substrate and adhesive layers formed on both sides of said paper substrate, wherein said paper substrate is capable of ply separation by a force smaller than a force required to separate adhesive faces of said adhesive layers from either the terminal portion of said web or the cylindrical body.

2. The web take-up roll of claim 1, wherein said double-coated tacky tape is arranged to extend in the lateral direction of said web.

3. The web take-up roll of claim 1, wherein said double-coated tacky tape is arranged to extend in the longitudinal direction of said web.

* * * * *